(12) United States Patent
Harano

(10) Patent No.: US 8,879,115 B2
(45) Date of Patent: Nov. 4, 2014

(54) IMAGE PROCESSING APPARATUS, METHOD FOR CONTROLLING THE SAME, AND STORAGE MEDIUM

(75) Inventor: Yuzo Harano, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 738 days.

(21) Appl. No.: 13/085,218

(22) Filed: Apr. 12, 2011

(65) Prior Publication Data

US 2011/0255099 A1 Oct. 20, 2011

(30) Foreign Application Priority Data

Apr. 16, 2010 (JP) .................................. 2010-095271

(51) Int. Cl.
*G06F 15/00* (2006.01)
*G06F 3/12* (2006.01)

(52) U.S. Cl.
CPC ............ *G06F 3/1288* (2013.01); *G06F 3/1264* (2013.01); *G06F 3/1232* (2013.01); *G06F 3/1256* (2013.01); *G06F 3/1208* (2013.01)
USPC .......................................... 358/1.5; 358/1.18

(58) Field of Classification Search
USPC .................... 358/1.5, 1.1, 1.3, 3.28, 1.18, 296
See application file for complete search history.

(56) References Cited

U.S. PATENT DOCUMENTS

| | | | |
|---|---|---|---|
| 5,717,843 A * | 2/1998 | Tabata et al. ................. | 358/1.18 |
| 6,927,865 B1 | 8/2005 | Kujirai et al. | |
| 7,860,411 B2 | 12/2010 | Toda | |
| 8,305,620 B2 * | 11/2012 | Toriumi ....................... | 358/1.15 |
| 2002/0085223 A1 * | 7/2002 | Bigi ............................. | 358/1.13 |
| 2004/0042812 A1 * | 3/2004 | Sakuma ......................... | 399/82 |
| 2006/0065744 A1 * | 3/2006 | Tai et al. ....................... | 235/492 |
| 2009/0103114 A1 * | 4/2009 | Nishimura ..................... | 358/1.5 |

FOREIGN PATENT DOCUMENTS

| | | |
|---|---|---|
| JP | 11-179994 A | 7/1999 |
| JP | 2000-301493 A | 10/2000 |
| JP | 2000-343797 A | 12/2000 |
| JP | 2001-067347 A | 3/2001 |
| JP | 2005-212460 A | 8/2005 |
| JP | 2007-050546 A | 3/2007 |

* cited by examiner

*Primary Examiner* — Thomas D Lee
(74) *Attorney, Agent, or Firm* — Canon USA, Inc., IP Division

(57) ABSTRACT

An image processing apparatus includes an acquisition unit, a determination unit, and a printing unit. The acquisition unit acquires post-processing information indicating a capability of a post-processing unit specified by a received print job. The determination unit determines a target position on a recording sheet subjected to post-processing to be applied by the post-processing unit based on the post-processing information. The printing unit prints a marking image at the target position on the recording sheet determined by the determination unit. The printing unit prints the marking image so that a deviation of the post-processing by the post-processing unit can be recognized. In addition, the printing unit changes a shape of the marking image to a shape suitable for the accuracy expected for the post-processing, according to an accuracy expected for the post-processing to be applied by the post-processing unit set for a print instruction of the print job marking image.

20 Claims, 13 Drawing Sheets

FIG.2

| POST-PROCESSING APPARATUS NAME | TYPE | HOLE DIAMETER | FIRST HOLE POSITION COORDINATES | INTERVAL BETWEEN HOLES | APPLICABLE SHEET | QUALITY ACCURACY (TOLERANCE) |
|---|---|---|---|---|---|---|
| PUNCHER UNIT A1 | 2 HOLES | 8 mm | X = 10 mm<br>Y = 100 mm | 200 mm | A4<br>A3R | ±2 mm |
| PUNCHER UNIT A2 | 3 HOLES | 8 mm | X = 10 mm<br>Y = 70 mm | 150 mm | LETTER<br>11×17R | ±2 mm |
| PUNCHER UNIT B1 | 30 HOLES | 5 mm | X = 10 mm<br>Y = 10 mm | 10 mm | A4 | ±1 mm |
| ... | ... | ... | ... | ... | ... | ... |
| ... | ... | ... | ... | ... | ... | ... |

*0201 / 0202 / 0203 / 0204 / 0205 / 0206 / 0207*

EXEMPLARY POST-PRINT PROCESSING INFORMATION (FOR PUNCHERS) IN STORAGE UNIT

FIG.3
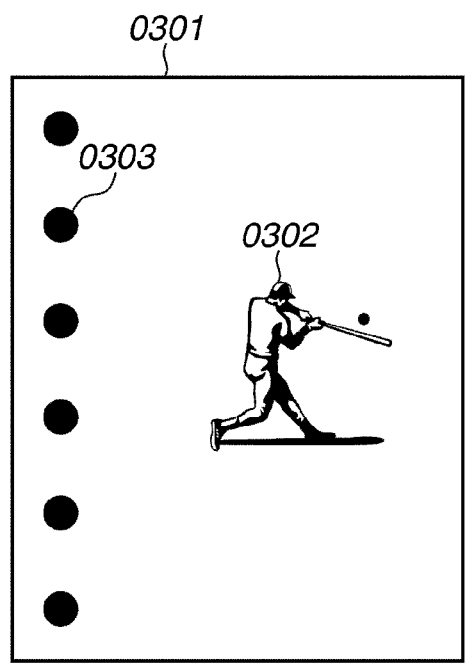
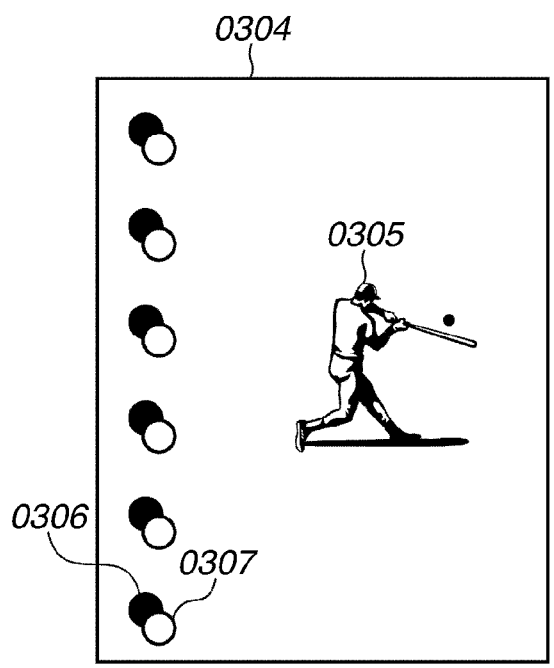 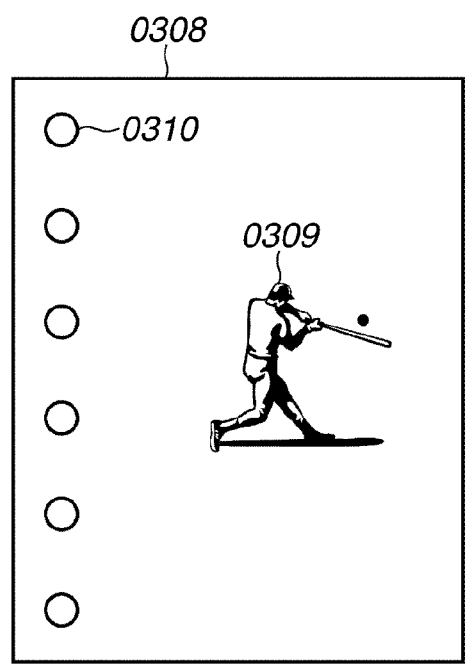

FIG.4
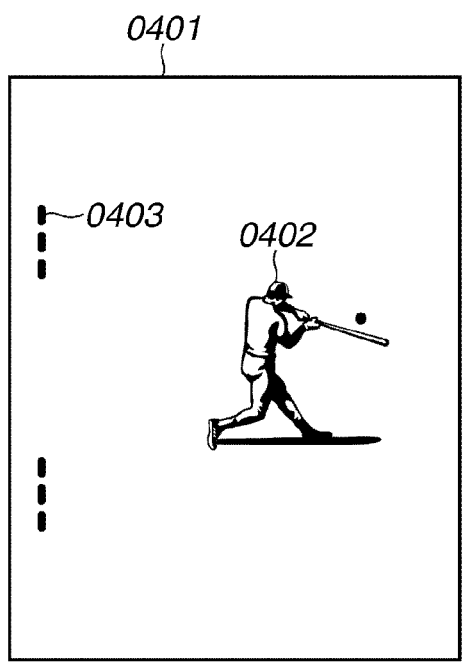
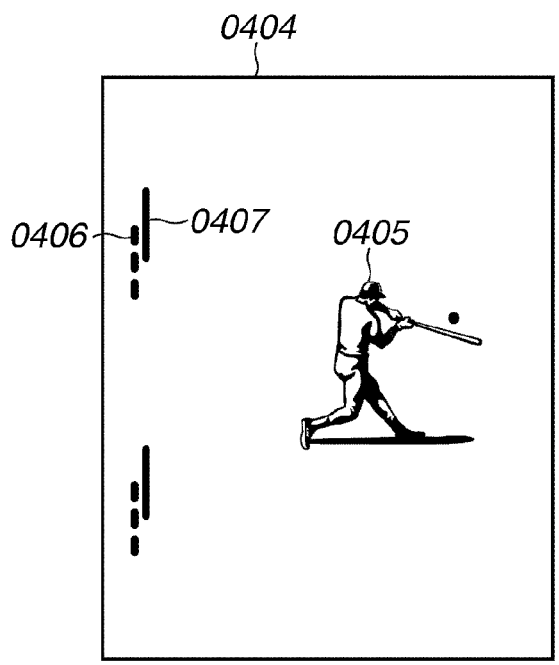
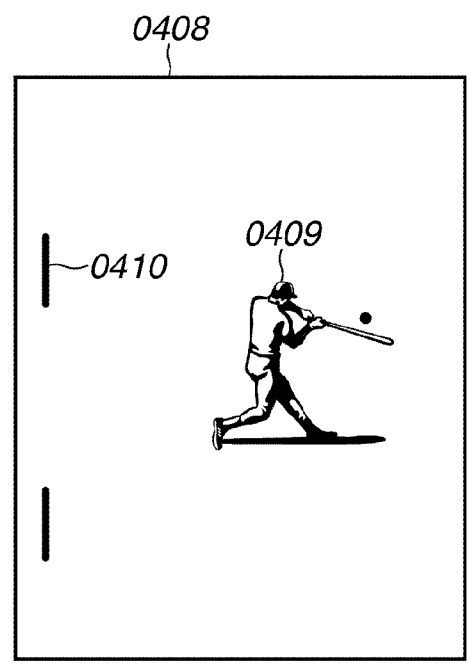

FIG.5
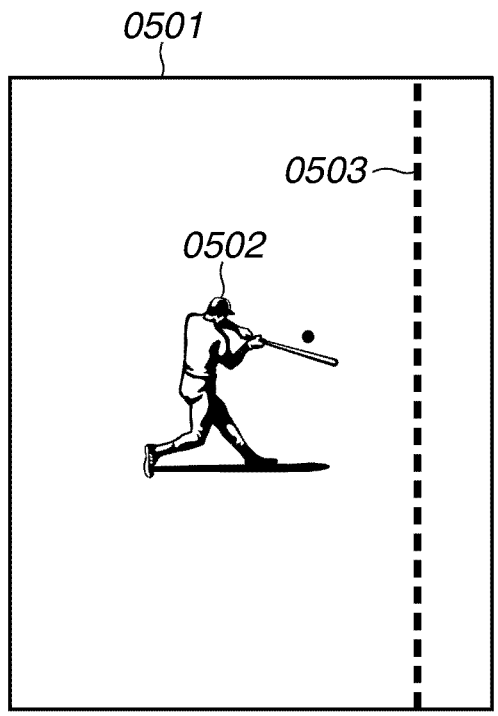
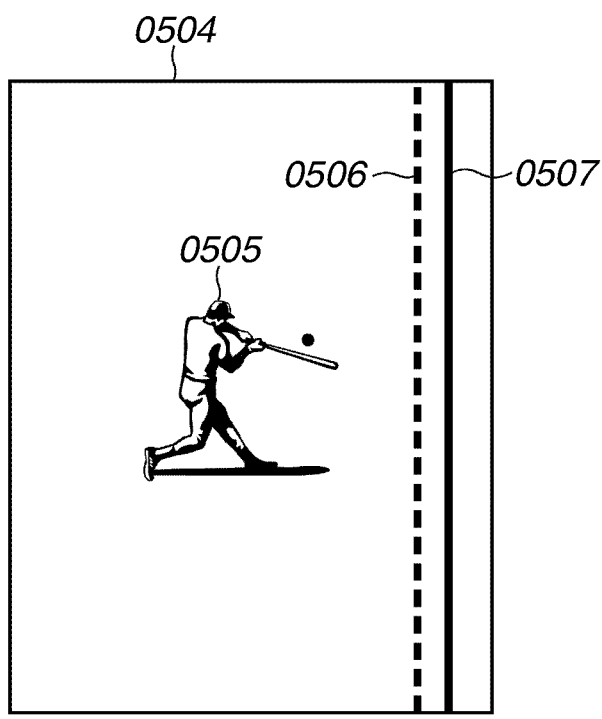
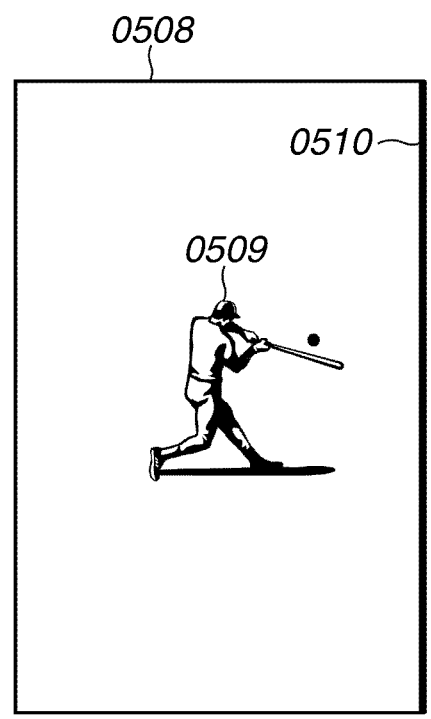

FIG.6
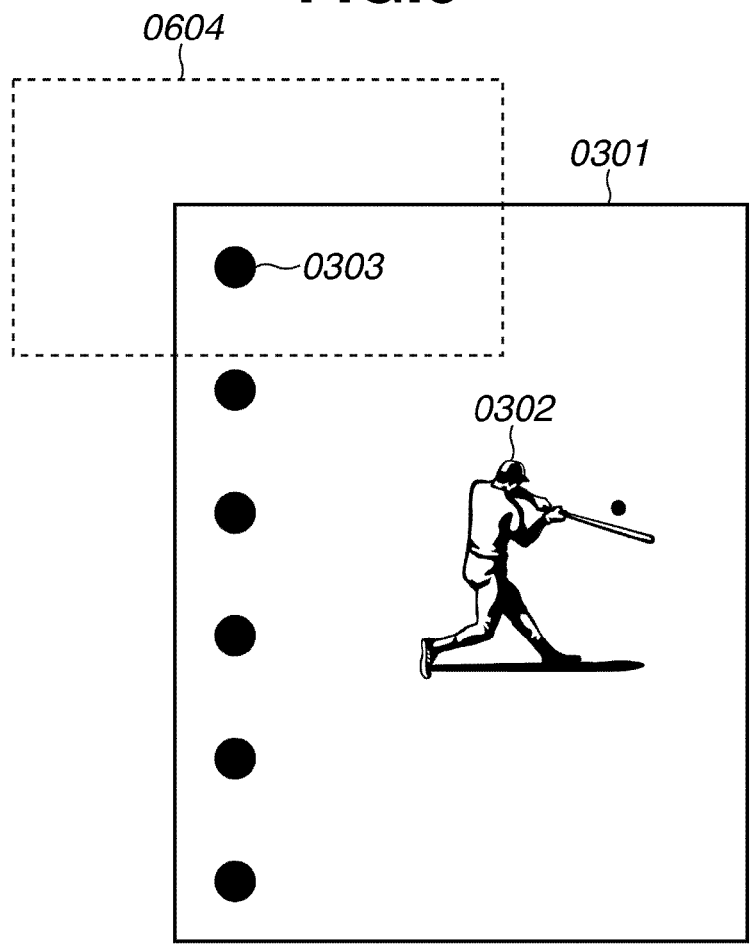
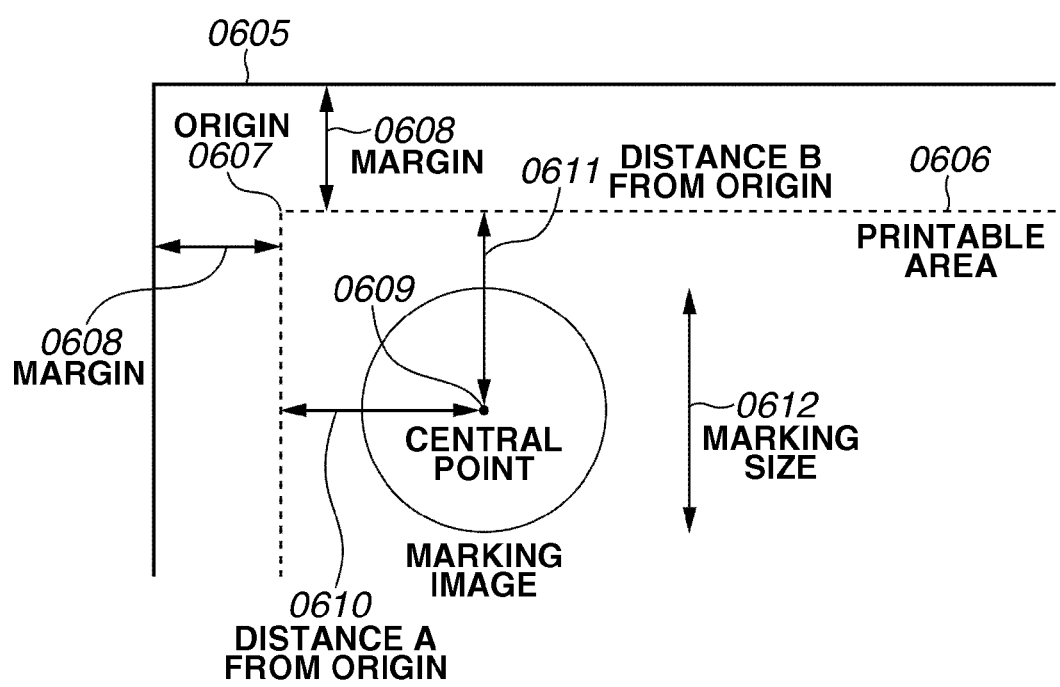

IMAGE PROCESSING APPARATUS, METHOD FOR CONTROLLING THE SAME, AND STORAGE MEDIUM

BACKGROUND OF THE INVENTION

1. Field of the Invention

The present invention relates to an image processing apparatus capable of checking the finishing state of post-processing for a print product, a method for controlling the image processing apparatus, and a storage medium.

2. Description of the Related Art

A printing system includes finishing apparatuses for a printing apparatus that implement post-processing functions such as punching processing, stapling processing, and trimming processing. For example, in the commercial printing market represented by print on demand (POD), since these finishing apparatuses are used to complete a print product as a commercial product, high printing accuracy and high processing accuracy of the finishing apparatuses are required. In the above mentioned commercial printing market, it is common to visually inspect the print product by the human eyes for the printing accuracy as well as the accuracy and quality of post-processing (finishing state). However, in reality, it is difficult to determine to pass or fail the criterion of application positions of punching processing, stapling processing, and trimming processing by the visual inspection.

It is common that, based on printing apparatus information and print instruction data, a conventional image processing apparatus generates and displays data for preview in consideration of information about the printing apparatus. In addition to that, there is a conventional technique for generating and displaying preview data which shows a back surface as if it can be seen through in the case that two-sided printing is included in page setting of print instruction data. (See Japanese Patent Application Laid-Open No. 2001-67347.) There is another conventional technique that compares an original data image of print instruction data with image data formed by scanning a print product of the original data image. (See Japanese Patent Application Laid-Open No. 2007-50546.) There is yet another conventional technique that improves the mechanical accuracy for applying post-processing to a more exact position. (See Japanese Patent Application Laid-Open No. 2000-301493.)

However, the above described conventional techniques cannot be used in an inspection process in which the finishing state of the post-processing for a print product is visually inspected by the human eyes after completion of the post-processing. The technique discussed in Japanese Patent Application Laid-Open No. 2001-67347 virtually checks an application position of post-processing on a print product using a preview image in a pre-print process, not after applying the post-processing. More specifically, this technique does not inspect whether the post-processing has been applied to a correct position after completion of the post-processing.

The technique discussed in Japanese Patent Application Laid-Open No. 2007-50546 compares an original data image of the print instruction data with image data formed by scanning a print product on which the original data image is printed. More specifically, this technique is intended to inspect the original data image (source data), and primarily does not take into consideration an application position of the post-processing. The technique discussed in Japanese Patent Application Laid-Open No. 2000-301493 is intended to improve the mechanical accuracy for applying the post-processing to a more exact position. More specifically, this technique does not take into consideration inspection after the post-processing is actually applied.

The above described techniques have a common issue of the difficulty in inspecting the finishing state of the post-processing for a print product after completion of the post-processing.

SUMMARY OF THE INVENTION

According to an aspect of the present invention, an image processing apparatus includes an acquisition unit configured to acquire post-processing information indicating a capability of a post-processing unit specified by a received print job; a determination unit configured to determine a target position on a recording sheet subjected to post-processing to be applied by the post-processing unit based on the post-processing information; and a printing unit configured to print a marking image at the target position on the recording sheet determined by the determination unit, wherein the printing unit prints the marking image so that a deviation of the post-processing by the post-processing unit can be recognized based on a state where the marking image disappears if the post-processing is suitably applied to the target position on the recording sheet by the post-processing unit, or based on a state where the marking image at least partly remains visible if the post-processing is not suitably applied to the target position on the recording sheet by the post-processing unit, and changes a shape of the marking image, according to information about an accuracy expected for the post-processing to be applied by the post-processing unit set for a print instruction of the marking image included in the print job, to a shape suitable for the accuracy expected for the post-processing.

According to the present invention, there is provided an image processing apparatus capable of facilitating inspection of the finishing state of the post-processing for a print product after completion of the post-processing.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 illustrates an example of post-processing information.

FIG. 3 illustrates examples of a print product in which a marking image is combined with print image data, and print products to which the post-processing is applied in the case of punching processing.

FIG. 4 illustrates examples of a print product in which a marking image is combined with print image data, and print products to which the post-processing is applied in the case of stapling processing.

FIG. 5 illustrates examples of a print product in which a marking image is combined with print image data, and print products to which the post-processing is applied in the case of trimming processing.

FIG. 6 illustrates an example of a method for determining a position and a size of a marking image.

DESCRIPTION OF THE EMBODIMENTS

Various exemplary embodiments, features, and aspects of the invention will be described in detail below with reference to the drawings.

Figure 1:
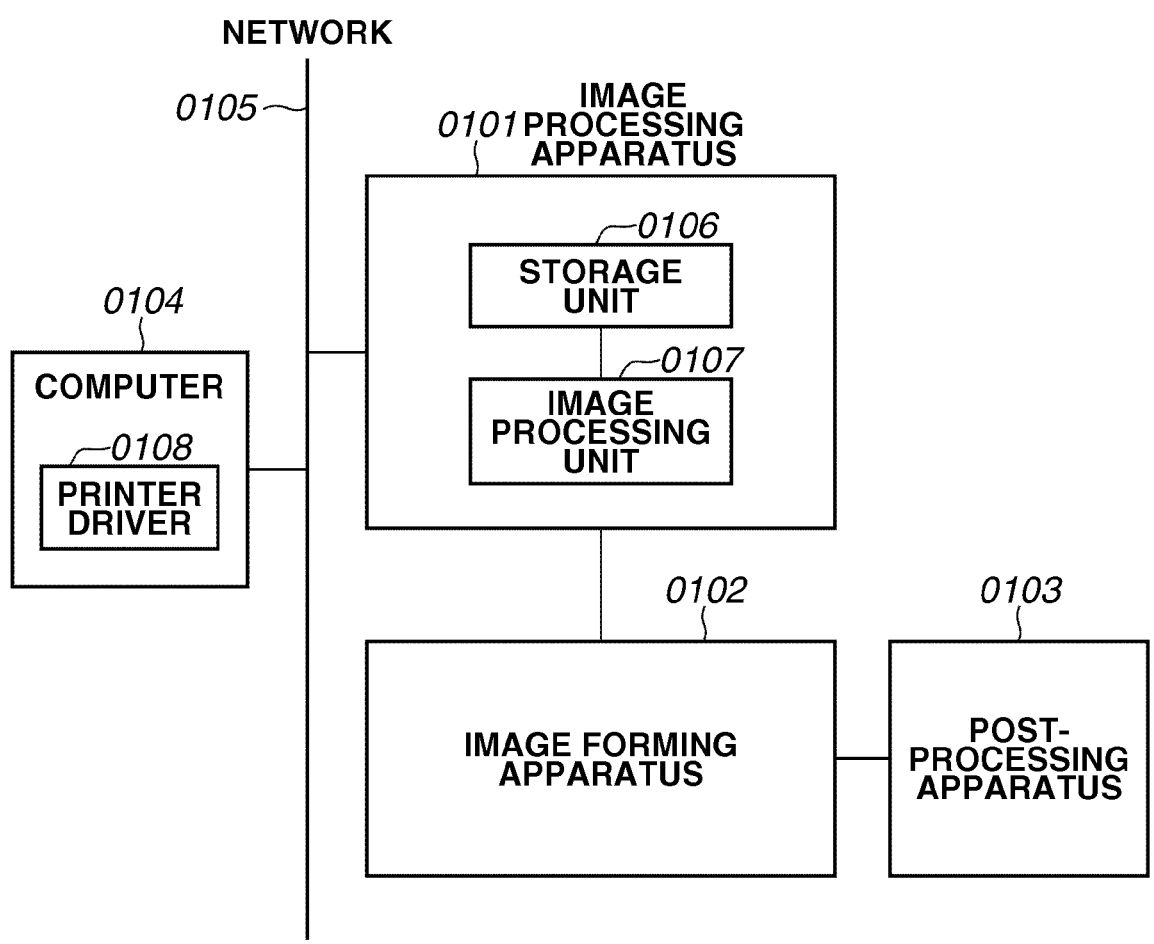
FIG. 1 illustrates an overall configuration of a printing system according to a first exemplary embodiment.

FIG. 1 illustrates an overall configuration of a printing system according to a first exemplary embodiment. The printing system according to the present exemplary embodiment includes an image processing apparatus 0101, an image forming apparatus 0102, a post-processing apparatus 0103, a computer 0104 serving as an information processing apparatus, and a network 0105.

The image processing apparatus 0101 includes a storage unit 0106 and an image processing unit 0107, and will be described as a print controller in the present exemplary embodiment. The storage unit 0106 stores post-processing information including types, functions, and accuracy of various post-processing apparatuses which may be connected to the printing system, and will be described as a hard disk drive in the present exemplary embodiment.

The image processing unit 0107 performs copy operation and processes a print job based on the page description language (PDL). Then, the image processing unit 0107 generates print image data and then transmits the print image data to the image forming apparatus 0102, which will be described below. The image processing unit 0107 is stored as a program in a read-only memory (ROM) of the image processing apparatus 0101. The function of the image processing unit 0107 is achieved when a central processing unit (CPU) of the image processing apparatus 0101 executes the program. The PDL refers to a page description language used to describe instructions for controlling a page printer. Post Script (PS) and printer control language (PCL) are typical PDLs.

When the post-processing apparatus 0103 is connected to the printing system, the image processing unit 0107 extracts post-processing information regarding the connected post-processing apparatus 0103 from the storage unit 0106. When application of post-processing is instructed in a print job, the image processing unit 0107 combines marking image data with print image data included in the print job so that a predetermined mark (marking image) is printed at a target position on a recording sheet subjected to the post-processing.

A marking image refers to a mark which indicates the target position subjected to the post-processing by the post-processing apparatus 0103. The marking image will disappear after the post-processing has been suitably applied to the target position on the recording sheet by the post-processing apparatus 0103. In other words, when the post-processing has not been suitably applied to the target position on the recording sheet by the post-processing apparatus 0103, the marking image at least partly remains visible. From the remaining marking image, a user can recognize a deviation of the post-processing by the post-processing apparatus 0103. Processing performed by the image processing unit 0107 will be described in detail below.

The image forming apparatus 0102 is physically connected with the image processing apparatus 0101, and configured to print the print image data transmitted from the image processing unit 0107. The image forming apparatus 0102 will be described as a printer in the present exemplary embodiment.

The post-processing apparatus 0103 is physically connected with the image forming apparatus 0102, and configured to apply predetermined finishing processing to a print product output by the image forming apparatus 0102. The post-processing apparatus 0103 will be described as an inline finisher for the image forming apparatus 0102 in the present exemplary embodiment. The inline finisher refers to, for example, a puncher that makes holes on a print product, a stapler that applies staples to the print product, or a trimmer that cuts the print product. Although the image processing apparatus 0101, the image forming apparatus 0102, and the post-processing apparatus 0103 are described as separate apparatuses, the image forming apparatus 0102 and the post-processing apparatus 0103 may be integrated in the image processing apparatus 0101.

The computer 0104 includes a printer driver 0108 installed therein. The computer 0104 will be described as a personal computer (PC) in the present exemplary embodiment. The printer driver 0108 is software operating on an operating system (OS) which controls the computer 0104. The printer driver 0108 represents print data with the PDL according to a print instruction from application software to form a print job.

The network 0105 is a global or a local network represented by the Internet or a local area network (LAN) which serves as a medium for connecting the image processing apparatus 0101 and the computer 0104. A network communication technique represented by the Transmission Control Protocol/Internet Protocol (TCP/IP) is used for connection.

Figure 13:
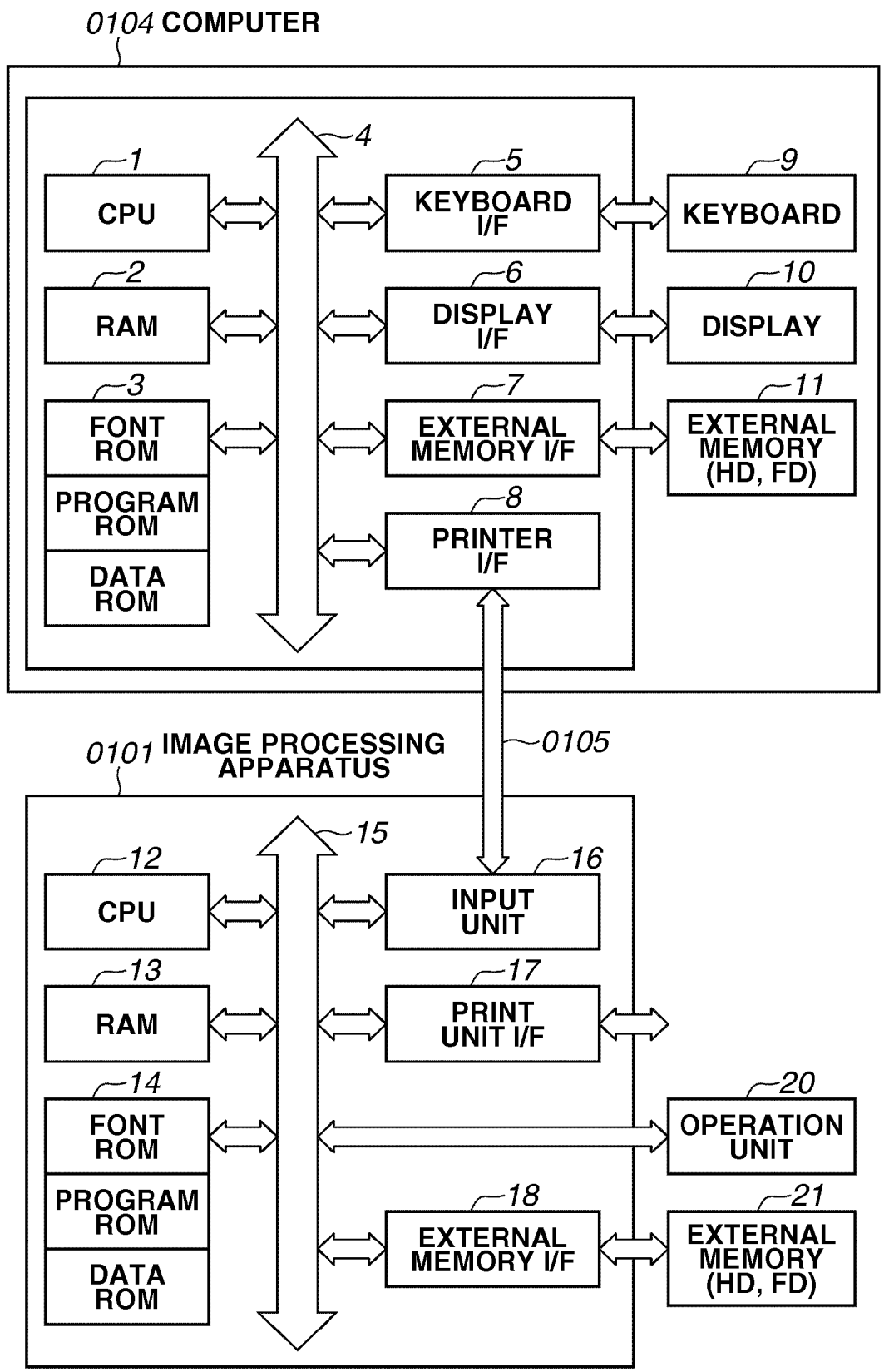
FIG. 13 is a block diagram illustrating a hardware configuration of a computer and an image processing apparatus according the exemplary embodiment.

FIG. 13 is a block diagram illustrating a hardware configuration of the computer 0104 and the image processing apparatus 0101. Referring to FIG. 13, the computer 0104 is an information processing apparatus used in the printing system according to the present exemplary embodiment. The computer 0104 includes a CPU 1 which processes a document containing graphics, images, characters, tables, (including spreadsheets) and the like according to a document processing program stored in a program ROM area of a ROM 3 or an external memory 11.

The CPU 1 totally controls devices connected to a system bus 4. The program ROM area of the ROM 3 or the external memory 11 stores the OS, i.e., a control program for the CPU 1. A font ROM area of the ROM 3 or the external memory 11 stores font data used in the above described document processing. A data ROM area of the ROM 3 or the external memory 11 stores various pieces of data used in the above described document processing.

A random access memory (RAM) 2 serves as a main memory and a work area for the CPU 1. A keyboard interface (I/F) 5 controls key input from the user via a keyboard 9 or a pointing device (not illustrated). A display I/F 6 controls display of a display 10. An external memory I/F 7 controls access to the external memory 11 such as a hard disk (HD) or a flexible disk (FD). The external memory 11 stores a boot program, various pieces of application software, font data, user files, editable files, the printer driver 0108, and the like.

A printer I/F 8 is connected with the image processing apparatus 0101 via a predetermined bidirectional interface 30 to control communication with the image processing apparatus 0101. The CPU 1 rasterizes an outline font into a display information RAM set, for example, in the RAM 2 to enable what you see is what you get (WYSIWYG) display on the display 10. The CPU 1 opens various registered windows based on a command selected by a mouse cursor (not illustrated) on the display 10 to perform various types of data processing.

When information created by application software is printed, the user opens on the display 10 a user interface for performing setting for the information to perform setting of the image processing apparatus 0101 and select a print mode. In this case, the user can set various types of print processing methods via a user interface provided by the printer driver 0108.

The image processing apparatus 0101 is a print controller used in the printing system according to the present exemplary embodiment. The image processing apparatus 0101 includes a CPU 12 which outputs an image signal (output information) to the image forming apparatus 0102 via a printing unit I/F 17 connected to a system bus 15 based on a control program stored in a program ROM area of a ROM 14 or an external memory 21.

The program ROM area of the ROM 14 also stores the control program for the CPU 12. A font ROM area of the ROM 14 stores font data used to generate the above described output information. The control program stored in the ROM 14 also includes the image processing unit 0107. Various types of processing in the present exemplary embodiment are achieved when the CPU 12 executes the image processing unit 0107.

The CPU 12 can perform bidirectional communication with a host computer 100 via an input unit 16, and is configured to transmit information in the image processing apparatus 0101 to the host computer 100. The information that can be transmitted from the image processing apparatus 0101 to the host computer 100 includes a status of a printer engine, network setting information, device names, resource names, and so on.

A RAM 13 serves as a main memory and a work memory for the CPU 12. An option RAM can be connected to an extension port (not illustrated) to expand the memory capacity of the RAM 13. The RAM 13 is used as an output information rasterization area, an environmental data storage area, and a nonvolatile RAM (NVRAM). Access to/from the above described external memory 21 such as a hard disk (HD) or an integrated circuit (IC) card is controlled by an external memory I/F 18.

The external memory 21 is connected as an option, and stores font data, an emulation program (EP), etc. The image processing apparatus is provided with at least one external memory 21 connected thereto. More specifically, a plurality of external memories such as an option font card storing option fonts (in addition to built-in fonts) and an external memory storing programs for interpreting printer control languages of different language systems may be connected to the image processing apparatus.

The image processing apparatus 0101 is not necessarily provided with the external memory 21. When the external memory 21 is not provided, data stored in the external memory 21 will be stored in the ROM 14. Further, the image processing apparatus 0101 may include a NVRAM (not illustrated) to store printer mode setting information from an operation unit 20. The operation unit 20 is provided with switches and light-emitting diode (LED) indicators for user operations.

FIG. 2 illustrates an example of post-processing information stored in the storage unit 0106. FIG. 2 illustrates puncher units as examples of the post-processing apparatus 0103. The post-processing information includes a post-processing apparatus name 0201, a type 0202, a hole diameter 0203, first hole position coordinates 0204, an interval between holes 0205, an applicable sheet 0206, and a quality accuracy 0207 for each post-processing apparatus 0103.

The type 0202 indicates the number of holes to be punched on a recording sheet by each puncher. The hole diameter 0203 indicates the size of the hole to be punched by each puncher. The first hole position coordinates 0204 indicates a position on a recording sheet of a reference hole among a plurality of holes to be punched by each puncher. The interval between holes 0205 indicates a distance between adjacent holes to be punched by each puncher. The applicable sheet 0206 indicates types of sheets that can be punched by each puncher. The quality accuracy 0207 indicates a tolerance of the position of a hole punched by each puncher.

Not only the puncher, but also other post-processing apparatuses, such as a stapler, the storage unit 0106 stores various pieces of post-processing information including the type of the post-processing, and size, position, interval of positions of the processing to be performed.

FIG. 3 illustrates examples of a print product formed by the image processing unit 0107 by combining a marking image with print image data at a position subjected to post-processing by the post-processing apparatus 0103, and print products to which the post-processing is actually applied by the post-processing apparatus 0103. FIG. 3 illustrates a case when the post-processing apparatus 0103 is a puncher.

Print image data 0301 is print data to be printed on the print product before the post-processing is applied by the post-processing apparatus 0103. The print image data 0301 includes print image data 0302 originally included in a print job and marking image data 0303. The print image data 0302 is formed by the image processing unit 0107 by processing PDL-based print data in the print job received from the computer 0104. The print image data 0302 will be described as raster image data in the present exemplary embodiment.

The marking image data 0303 is formed by the image processing unit 0107 by reading the post-processing information for the post-processing apparatus 0103 from the storage unit 0106 and then combining as an image to be printed at a target position on the recording sheet subjected to the post-processing according to a post-processing instruction included in the print job. Similar to the print image data 0302, the marking image data 0303 will be described as raster image data in the present exemplary embodiment.

An output result 0304 and an output result 0308 respectively indicate a print product on which the print image data 0301 is printed and relevant post-processing is applied. The output result 0304 indicates a case in which a user in charge of print product inspection can recognize that punching processing applied by the post-processing apparatus 0103 has a problem.

The output result 0304 includes a print image 0305, a marking image 0306, and a post-processing result 0307. The print image 0305 indicates a state where the print image data 0302 is actually printed on the recording sheet by the image forming apparatus 0102. The marking image 0306 indicates a state where the marking image data 0303 is actually printed on the recording sheet by the image forming apparatus 0102. The post-processing result 0307 indicates a state where punching processing is actually applied to the recording sheet by the post-processing apparatus 0103.

By viewing the output result 0304, the user in charge of inspection can recognize that the marking image 0306 at least partly remains visible after completion of the punching processing by the post-processing apparatus 0103. More specifically, the user in charge of inspection can easily recognize that punching processing has not been suitably applied to the target position subjected to the punching processing by the post-processing apparatus 0103. Accordingly, the user can determine that the output result 0304 needs to be rejected as a failure of post-processing result.

On the other hand, the output result 0308 indicates a case where the user in charge of inspection can recognize that the punching processing has been suitably applied by the post-processing apparatus 0103. The output result 0308 includes a print image 0309 and a post-processing result 0310. The print image 0309 indicates a state where the print image data 0302 is actually printed on the recording sheet by the image forming apparatus 0102. The post-processing result 0310 indicates a state where the punching processing is actually applied to the recording sheet by the post-processing apparatus 0103.

Unlike the output result 0304, the output result 0308 has no remaining printing result of the marking image data 0303. This indicates that punching processing is suitably applied to the target position subjected to the punching processing by the post-processing apparatus 0103, and the printed marking image 0306 is punched out and hence disappears. Therefore, by viewing the output result 0308, the user in charge of inspection can easily recognize that the punching processing is suitably applied to the target position subjected to the punching processing by the post-processing apparatus 0103. Accordingly, the user can determine that the output result 0308 can be accepted as a post-processing result.

FIG. 4 illustrates examples of a print product formed by the image processing unit 0107 by combining a marking image with print image data at a position subjected to post-processing by the post-processing apparatus 0103, and print products to which the post-processing is actually applied by the post-processing apparatus 0103. FIG. 4 illustrates a case when the post-processing apparatus 0103 is a stapler.

Print image data 0401 is print data to be printed on the print product before the post-processing is applied by the post-processing apparatus 0103. The print image data 0401 includes print image data 0402 and marking image data 0403. The print image data 0402 is formed by the image processing unit 0107 by processing PDL-based print data in the print job received from the computer 0104. The print image data 0402 will be described as raster image data in the present exemplary embodiment.

The marking image data 0403 is formed by the image processing unit 0107 by reading the post-processing information for the post-processing apparatus 0103 from the storage unit 0106 and then combining as an image to be printed at a target position on the recording sheet subjected to the post-processing according to a post-processing instruction included in the print job. Similar to the print image data 0402, the marking image data 0403 will be described as raster image data in the present exemplary embodiment.

An output result 0404 and an output result 0408 respectively indicate a print product on which the print image data 0401 is printed and relevant post-processing is applied. The output result 0404 indicates a case where a user in charge of print product inspection can recognize that stapling processing applied by the post-processing apparatus 0103 has a problem.

The output result 0404 includes a print image 0405, a marking image 0406, and a post-processing result 0407. The print image 0405 indicates a state where the print image data 0402 is actually printed on the recording sheet by the image forming apparatus 0102. The marking image 0406 indicates a state where the marking image data 0403 is actually printed on the recording sheet by the image forming apparatus 0102. The post-processing result 0407 indicates a state where the stapling processing is actually applied to the recording sheet by the post-processing apparatus 0103.

By viewing the output result 0404, the user in charge of inspection can recognize that the marking image 0406 at least partly remains visible after completion of the stapling processing by the post-processing apparatus 0103. More specifically, the user in charge of inspection can easily recognize that the stapling processing has not been suitably applied to the target position subjected to the stapling processing by the post-processing apparatus 0103. Accordingly, the user can determine that the output result 0404 needs to be rejected as a failure of post-processing result.

On the other hand, the output result 0408 indicates a case where the user in charge of inspection can recognize that the stapling processing has been suitably applied by the post-processing apparatus 0103. The output result 0408 includes a print image 0409 and a post-processing result 0410. The print image 0409 indicates a state where the print image data 0402 is actually printed on the recording sheet by the image forming apparatus 0102. The post-processing result 0410 indicates a state where the stapling processing is actually applied to the recording sheet by the post-processing apparatus 0103.

Unlike the output result 0404, the output result 0408 has no remaining printing result of the marking image data 0403. This indicates that the stapling processing is suitably applied to the target position subjected to the stapling processing by the post-processing apparatus 0103 and the printed marking image 406 is covered by a stapling strip and hence disappears. Therefore, by viewing the output result 0408, the user in charge of inspection can easily recognize that the stapling processing is suitably applied to the target position subjected to the stapling processing by the post-processing apparatus 0103. Accordingly, the user can determine that the output result 0408 can be accepted as a post-processing result.

FIG. 5 illustrates examples of a print product formed by the image processing unit 0107 by combining a marking image with print image data at a position subjected to post-processing by the post-processing apparatus 0103, and print products to which the post-processing is actually applied by the post-processing apparatus 0103. FIG. 5 illustrates a case when the post-processing apparatus 0103 is a trimmer.

Print image data 0501 is print data to be printed on the print product before the post-processing is applied by the post-processing apparatus 0103. The print image data 0501 includes print image data 0502 and marking image data 0503. The print image data 0502 is formed by the image processing unit 0107 by processing PDL-based print data in the print job received from the computer 0104. The print image data 0502 will be described as raster image data in the present exemplary embodiment.

The marking image data 0503 is formed by the image processing unit 0107 by reading the post-processing information for the post-processing apparatus 0103 from the storage unit 0106 and then combining as an image to be printed at a target position on the recording sheet subjected to the post-processing according to a post-processing instruction included in the print job. Similar to the print image data 0502, the print image data 0503 will be described as raster image data in the present exemplary embodiment.

An output result 0504 and an output result 0508 respectively indicate a print product on which the print image data 0501 is printed and relevant post-processing is applied. The output result 0504 indicates a case where a user in charge of print product inspection can recognize that the trimming processing applied by the post-processing apparatus 0103 has a problem.

The output result 0504 includes a print image 0505, a marking image 0506, and a post-processing result 0507. The print image 0505 indicates a state where the print image data 0502 is actually printed on the recording sheet by the image forming apparatus 0102. The marking image 0506 indicates a state where the marking image data 0503 is actually printed on the recording sheet by the image forming apparatus 0102. The post-processing result 0507 indicates a state where the trimming processing is actually applied to the recording sheet by the post-processing apparatus 0103.

By viewing the output result 0504, the user in charge of inspection can recognize that the marking image 0506 at least partly remains visible after completion of the trimming processing by the post-processing apparatus 0103. More specifically, the user in charge of inspection can easily recognize that the trimming processing has not been suitably applied to the target position subjected to the trimming processing by the post-processing apparatus 0103. Accordingly, the user can determine that the output result 0504 needs to be rejected as a failure of a post-processing result.

On the other hand, the output result 0508 indicates a case where the user in charge of inspection can recognize that the trimming processing has been suitably applied by the post-processing apparatus 0103. The output result 0508 includes a print image 0509 and a post-processing result 0510. The print image 0509 indicates a state where the print image data 0502 is actually printed on the recording sheet by the image forming apparatus 0102. The post-processing result 0510 indicates a state where the trimming processing is actually applied to the recording sheet by the post-processing apparatus 0103.

Unlike the output result 0504, the output result 0508 has no remaining printing result of the marking image data 0503. This indicates that the trimming processing is suitably applied to the target position subjected to the trimming processing by the post-processing apparatus 0103, and the printed marking image 0506 is cut off and hence disappears. Therefore, by viewing the output result 0508, the user in charge of inspection can easily recognize that the trimming processing is suitably applied to the target position subjected to the trimming processing by the post-processing apparatus 0103. Accordingly, the user can determine that the output result 0508 can be accepted as a post-processing result.

Although the present invention is applicable to each of punching processing, stapling processing, and trimming processing, the punching processing will be described below as an example. Although the above described post-processing has specifically been described on the premise that print image data is included in a print job, the print image data is not limited thereto. The present invention is applicable to a case where only post-processing is applied to a recording sheet (for example, a preprint sheet) on which a print image has already been printed. In this case, only a marking image will be printed on the recording sheet.

FIG. 6 illustrates how the position and size of the marking image data 0303 are determined for the print image data 0301 illustrated in FIG. 3.

The print image data 0301, the print image data 0302, and the marking image data 0303 are similar to these pieces of data illustrated in FIG. 3 and therefore descriptions thereof will be omitted. Referring to FIG. 6, enlarged print image data 0605 is an enlarged view of an area 0604 enclosed by dotted lines.

To determine the position of the marking image data 0303, it is necessary to determine a target position subjected to actual post-processing by the post-processing apparatus 0103. In the case of punching processing described in the present exemplary embodiment, it is necessary to determine a central point 0609 of the target position subjected to punching. The image processing unit 0107 generates the marking image data 0303 having a size determined according to a user's selection on a user interface (UI), which is described below, and combines the marking image data 0303 with the print image data 0302 so that the relevant marking image is printed centering on the determined central point 0609.

To determine the central point 0609, it is necessary to find out an origin 0607, a distance B 0611 which is a vertical distance from the origin 0607 to the central point 0609, a distance A 0610 which is a horizontal direction from the origin 0607 to the central point 0609. The origin 0607 refers to an origin of a printable area 0606 on the recording sheet in which the image forming apparatus 0102 can perform printing.

First, the origin 0607 can be obtained by acquiring vertical and horizontal margins 0608 from capability information of the image forming apparatus 0102 stored in the storage unit 0106. The distance B 0611 and the distance A 0610 can be obtained by a first hole position coordinates 0204 among the post-processing information stored in the storage unit 0106. More specifically, since the first hole position coordinates 0204 is position coordinates on the recording sheet, the distance B 0611 and the distance A 0610 can be obtained by subtracting the value of the vertical and horizontal margins 0608 from the value of the first hole position coordinates 0204, respectively.

Thus, based on the origin 0607, the distance B 0611, and the distance A 0610 obtained in this way, the central point 0609, i.e., the target position subjected to the post-processing is determined. Then, the marking image will be printed on the determined target position. Likewise, also for the marking image data corresponding to the second and subsequent punched holes, the target position subjected to the post-processing can be determined based on the interval between holes 0205 in the post-processing information in FIG. 2 which is stored in the storage unit 0106. Then, the image processing unit 0107 generates and combines the marking image data 0303 with the print image data 0302 so that a marking image is printed at the target position.

Figure 7:
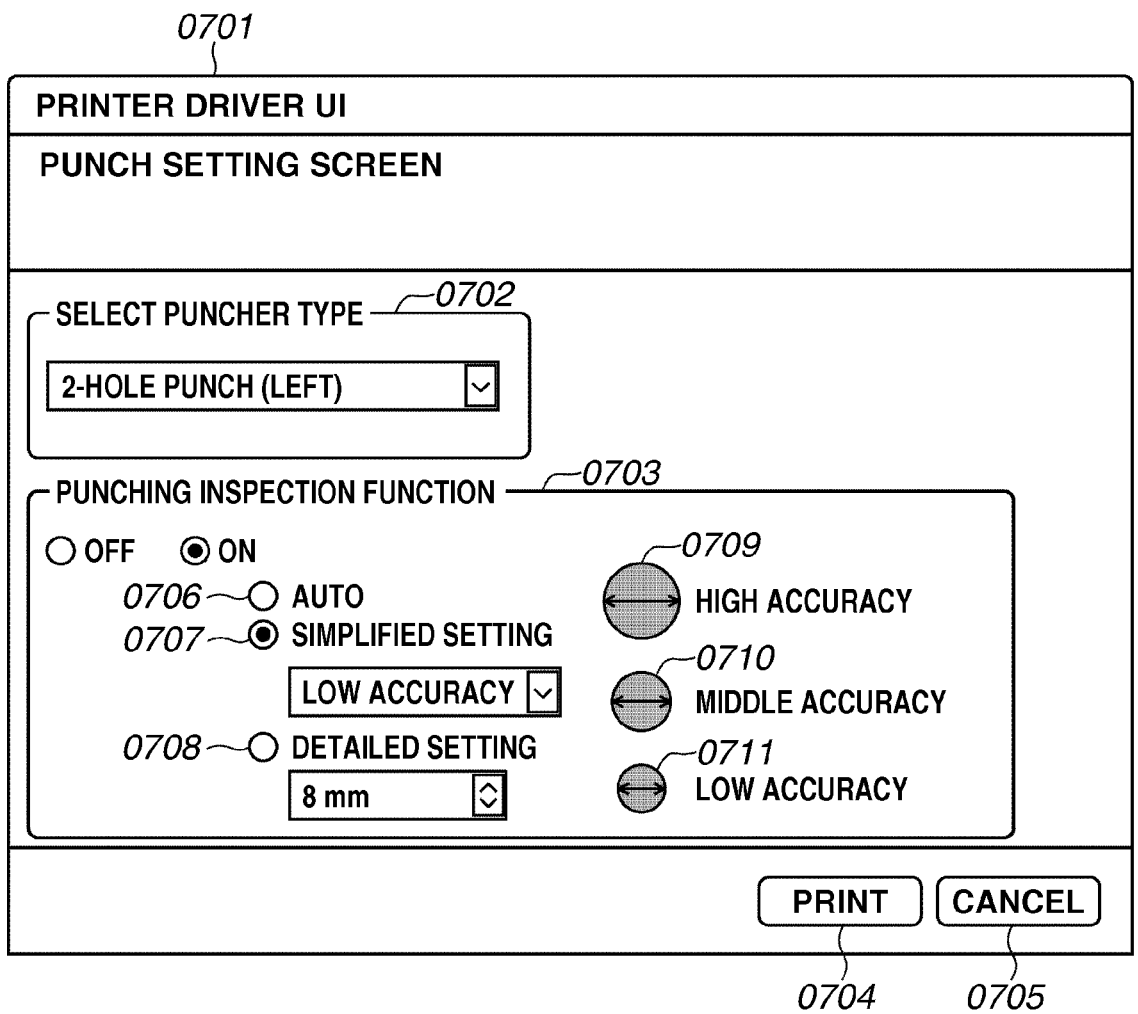
FIG. 7 illustrates an example of a user interface of a printer driver.

FIG. 7 illustrates an example of a UI for specifying information necessary for the image processing unit 0107 to generate a predetermined marking image via the printer driver 0108 on the computer 0104. The information includes the size, shape, accuracy, etc. of the predetermined marking image.

A UI 0701 includes a puncher type selection screen portion 0702, a punching inspection function selection screen portion 0703, a print button 0704, and a cancel button 0705. The UI 0701 is displayed on the display 10 when the printer driver 0108 is activated by the CPU 1 via application software on the computer 0104 and a punch setting, which is a function of the printer driver 0108, is selected.

The puncher type selection screen portion 0702 is a user interface for specifying a puncher type from a pull-down list. The user can select a desired puncher type from the pull-down list. The puncher type displayed in the pull-down list corresponds to the type 0202 of the post-processing information in FIG. 2 stored in the storage unit 0106. The post-processing information may be acquired by the CPU 1 from the storage unit 0106 of the image processing apparatus 0101 when the UI 0701 is displayed, and, further, the computer 0104 may store identical information in the external memory 11.

The punching inspection function selection screen portion 0703 includes three different options, namely an auto 0706, a simplified setting 0707, and a detailed setting 0708. These options are displayed in a selectable state when the punching inspection function selection screen portion 0703 is set to ON (ON is selected) and displayed in a non-selectable state (displayed in gray) when the punching inspection function selection screen portion 0703 is set to OFF (OFF is selected). The user can generate a desired print image by selecting any one of the auto 0706, the simplified setting 0707, and the detailed setting 0708 in the punching inspection function selection screen portion 0703.

In the punching inspection function selection screen portion 0703, when the user selects the auto 0706, the image processing unit 0107 generates a marking image having a diameter equal to arbitrary initial value suitable for the puncher type selected in the puncher type selection screen portion 0702. An item may be suitable if it has sufficient properties or required properties for a certain purpose or task. The arbitrary initial value is, for example, a value corresponding to the hole diameter 0203 and the quality accuracy 0207 suitable for the selected puncher type. For example, when "2 HOLES" is selected in the puncher type selection screen portion 0702, the corresponding hole diameter 0203 and quality accuracy 0207 are "8 mm" and "±2 mm", respectively, and therefore the initial value is "6 mm."

The hole diameter 0203 suitable for the selected puncher type indicates the maximum diameter of a marking image. The larger the hole diameter, the higher the required punching accuracy. Therefore, when the quality accuracy 0207 (tolerance) is "±2 mm", the initial value will be "6 mm" (the hole diameter 0203 "8 mm"–"2 mm"). The method for determining the initial value is not limited thereto. For example, the value of the hole diameter 0203 may be used as the initial value, and other method can be used.

In the punching inspection function selection screen portion 0703, when the user selects the simplified setting 0707, items "high accuracy", "middle accuracy", and "low accuracy" are displayed in the pull-down list. By selecting a desired accuracy from the pull-down list, the user can make simplified setting of a marking image to be printed. When the user selects an accuracy, the image processing unit 0107 generates a making image corresponding to the selected accuracy. Each of images of high accuracy 0709, middle accuracy 0710, and low accuracy 0711 illustrates the size of a marking image to be printed when each accuracy is selected in the simplified setting 0707.

In this case, the size of a hole to be punched by a puncher suitable for the selected puncher type may be displayed. Thus, the user can visually compare the size of an actual punched hole with the size of a generated marking image by the display.

As the size of the marking image to be generated according to the selected accuracy, for example, when the hole diameter 0203 suitable for the selected puncher type is "8 mm", the size of a marking image to be generated is "7 mm" (high accuracy), "5 mm" (middle accuracy), or "3 mm" (low accuracy). As described above, since the size of the marking image increases with increasing accuracy, the size of the marking image is maximized with the high accuracy and minimized with the low accuracy.

In the punching inspection function selection screen portion 0703, the user can instruct an accuracy expected for punching processing by the post-processing apparatus 0103. Upon reception of the instruction, the image processing apparatus 0101 increases the size of a combined marking image with increasing accuracy expected for punching processing, and decreases the size of a combined marking image with decreasing accuracy expected for punching processing.

In the punching inspection function selection screen portion 0703, when the detailed setting 0708 is selected, the user can specify the diameter of a marking image with a specific numeric value. When the user specifies the diameter of a marking image, the image processing unit 0107 generates a marking image having the specified diameter. It is desirable that the diameter of the marking image does not exceed the hole diameter 0203 suitable for the selected puncher type. If the printed marking image is larger than the punched hole, a part of the marking image at least partly remains visible on the print product after completion of the post-processing no matter how accurately punching processing is performed. Therefore, when the detailed setting 0708 is selected, a numeric value selectable by the user may be limited to a value not exceeding the hole diameter 0203 suitable for the selected puncher type, and an error may be notified when a specified numeric value exceeds the hole diameter 0203.

When the print button 0704 is pressed in the UI 0701, the printer driver 0108 generates a print job including a marking image print instruction indicating information about marking image printing set by the UI 0701, and then transmits the print job to the image processing apparatus 0101. The information about marking image printing includes information for determining the size of the marking image and information for determining the shape and color of the marking image. When the auto 0706 is selected, the information for determining the size of the marking image is the above described arbitrary initial value.

When the simplified setting 0707 is selected, the information for determining the size of the marking image is information about an expected accuracy in the post-processing selected by the user. When the detailed setting 0708 is selected, the information for determining the size of the marking image is the value specified by the user. The image processing unit 0107 of the image processing apparatus 0101 determines the size of the marking image to be printed according to the information for determining the size of the marking image included in the print instruction received by receive processing.

When the print job is transmitted, the UI 0701 as the punching setting screen ends. When the cancel button 0705 is pressed, the printer driver 0108 cancels the UI 0701 as the punching setting screen and then ends.

Figure 8:
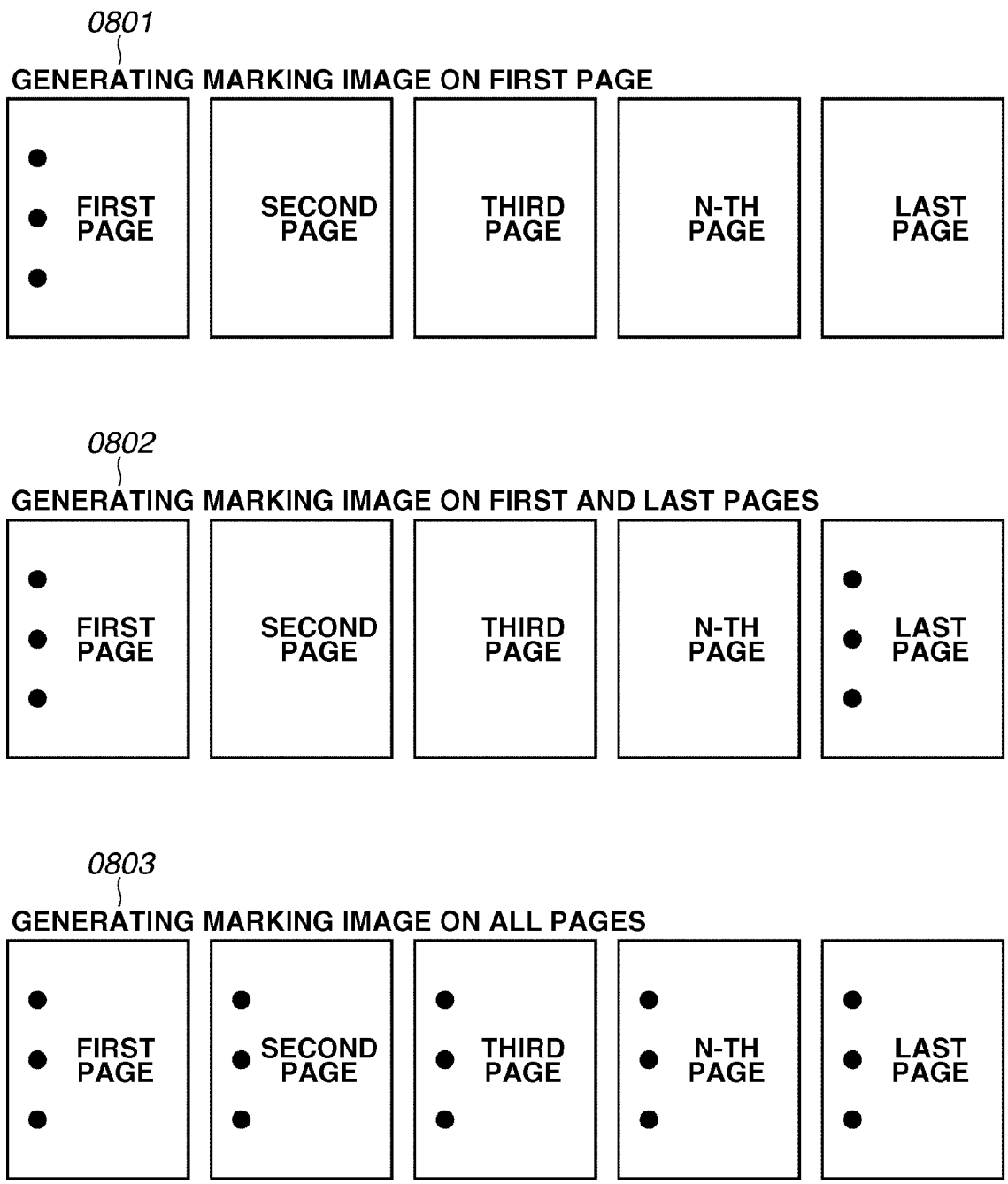
FIG. 8 illustrates an example of a method for combining a marking image when a print job includes a plurality of pages.

FIG. 8 illustrates an example of a method for printing a marking image generated by the image processing unit 0107 on at least one page, when a print job includes a plurality of pages.

An example of a job for printing a marking image on the first page 0801 indicates a case where the marking image generated by the image processing unit 0107 is to be printed only on the first page of the print job including the plurality of pages. In this case, the marking image is not printed on the print image data on the second and subsequent pages. Although the user in charge of inspection needs to visually check only the first page, the user cannot visually check the post-processing accuracy for other pages. Therefore, this example provides a low overall reliability of accuracy measurement.

An example a job for generating a marking image on first and last pages 0802 indicates a case where the marking image generated by the image processing unit 0107 is to be printed only on the first and last pages of the print job including a plurality of pages. In this case, the marking image is not printed on the marking image data on pages other than the first and last pages. Although the user in charge of inspection needs to visually check only the first page and the last page, the user cannot visually check the post-processing accuracy for other pages. However, since the accuracy for the last page is measured, this example provides a middle overall reliability of accuracy measurement.

An example of a job for generating a marking image on all pages 0803 indicates a case where the marking image generated by the image processing unit 0107 is to be printed on all pages of the print job including a plurality of pages. Although the user in charge of inspection needs to visually check all pages, the user can measure the accuracy for all pages. Therefore, this example provides a high overall reliability of accuracy measurement.

The above described printing methods may be set in the UI 0701 illustrated in FIG. 7 or may be set on the image processing apparatus 0101.

Figure 9:
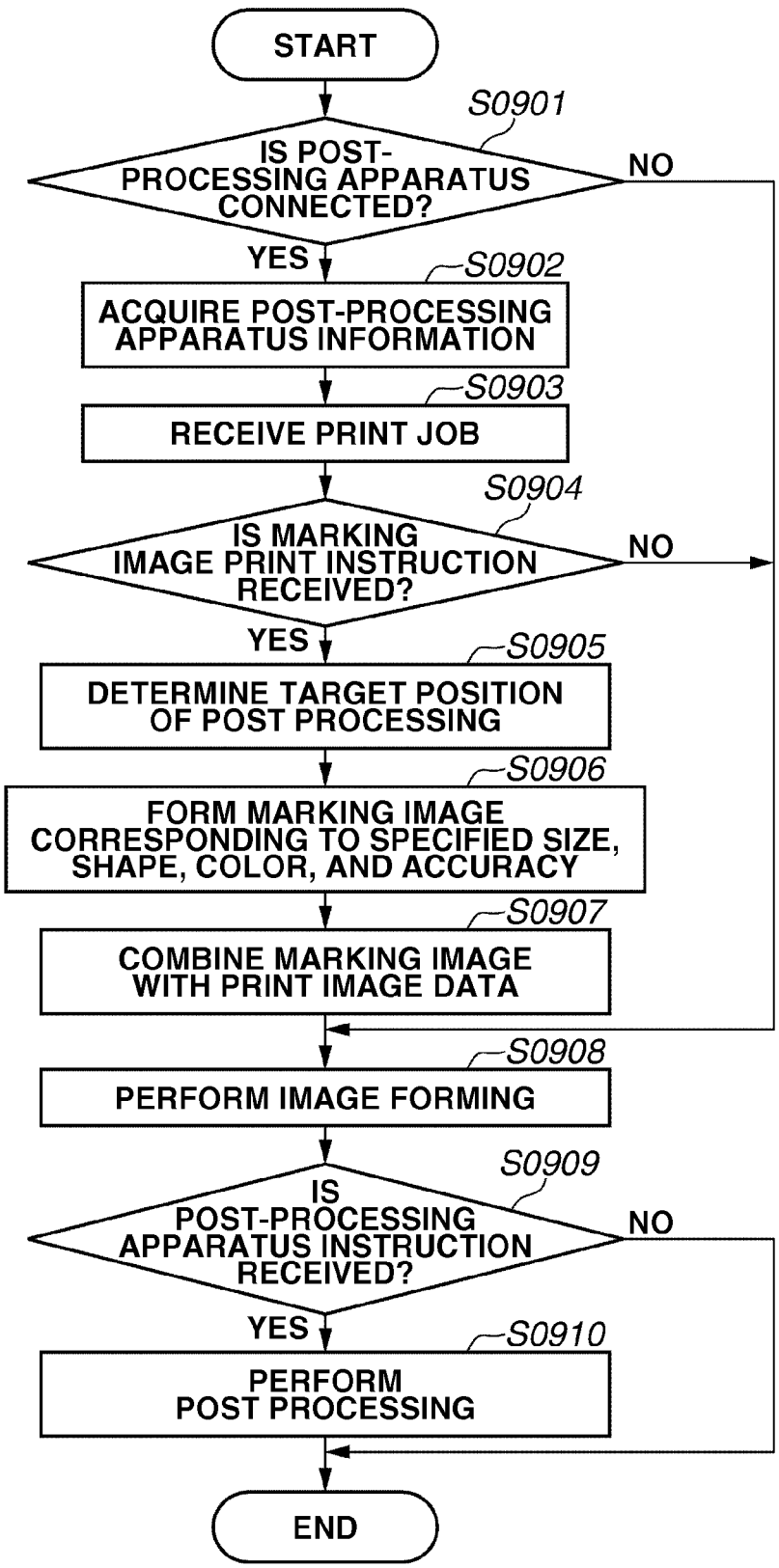
FIG. 9 is a flow chart illustrating operations executed in the printing system.

FIG. 9 is a flow chart illustrating operations executed in the printing system according to the present exemplary embodiment. In this flow chart, the processing by the image processing unit 0107 is achieved when the CPU 12 executes the image processing unit 0107 serving as a control program.

In step S0901, the image processing unit 0107 determines whether the post-processing apparatus 0103 is connected to the printing system. When the image processing unit 0107 determines that the post-processing apparatus 0103 is connected (YES in step S0901), the processing proceeds to step S0902. Otherwise, when the image processing unit 0107 determines that post-processing apparatus 0103 is not connected (NO in step S0901), the processing proceeds to step S0908. In step S0902, the image processing unit 0107 acquires from the storage unit 0106 post-processing information for the connected post-processing apparatus 0103.

In step S0903, the image processing unit 0107 receives a print job transmitted from the printer driver 0108. In step S0904, the image processing unit 0107 determines whether the received print job includes a marking image print instruction corresponding to the post-processing to be applied by the print job. When the image processing unit 0107 determines that the print job includes the marking image print instruction (YES in step S0904), the processing proceeds to step S0905. Otherwise, when the image processing unit 0107 determines that the print job does not include the marking image print instruction (NO in step S0904), the processing proceeds to step S0908.

In step S0905, based on the contents of the instruction (selected puncher type) of the print job and the post-processing information acquired from the storage unit 0106, the image processing unit 0107 determines a target position subjected to the post-processing. The method for determining the target position is as illustrated in FIG. 6. In step S0906, the image processing unit 0107 generates a marking image according to the size, shape, color, and accuracy of a marking image specified in the information about marking image printing included in the print job. The size of the marking image to be specifically generated is as illustrated in FIG. 7.

In step S0907, the image processing unit 0107 combines the marking image generated in step S0906 with the print image data generated by processing the print job, thus generates new print image data. In step S0908, the image processing unit 0107 transmits the generated print image data to the image forming apparatus 0102. Then, the image forming apparatus 0102 prints the print image data on a recording sheet to produce a print product. When the image processing unit 0107 determines in step S0901 that the post-processing apparatus 0103 is not connected, or when the image processing unit 0107 determines in step S0904 that the received print job does not include the marking image generation instruction, the image processing unit 0107 performs image formation according to the print job.

In step S0909, the image processing unit 0107 determines whether the received print job includes a post-processing application instruction for the post-processing apparatus 0103. When the image processing unit 0107 determines that the print job includes the post-processing application instruction (YES in step S0909), the processing proceeds to step S0910. Otherwise, when the image processing unit 0107 determines that the print job does not include the post-processing application instruction (NO in step S0909), the processing in this flow chart ends. In step S0910, the post-processing apparatus 0103 applies the predetermined post-processing to the print product printed by the image forming apparatus 0102 under control of the image processing unit 0107, and outputs the print product.

When the image processing apparatus 0101 performs the above described processing, it becomes possible to easily and correctly inspect by the human eyes the accuracy and quality after post-processing in the printing system. Further, it becomes possible to specify the inspection accuracy for post-processing as requested by an operator who executes the print job in the printing system.

The first exemplary embodiment has specifically been described based on a case where the post-processing apparatus 0103 is an inline finisher. A second exemplary embodiment will be described in detail below with reference to FIG. 10 based on a case where the post-processing apparatus 0103 is a near-line finisher or an off-line finisher not physically connected to an image processing apparatus 0101. In the present exemplary embodiment, only differences from the first exemplary embodiment will be described and therefore duplicated descriptions will be omitted.

Figure 10:
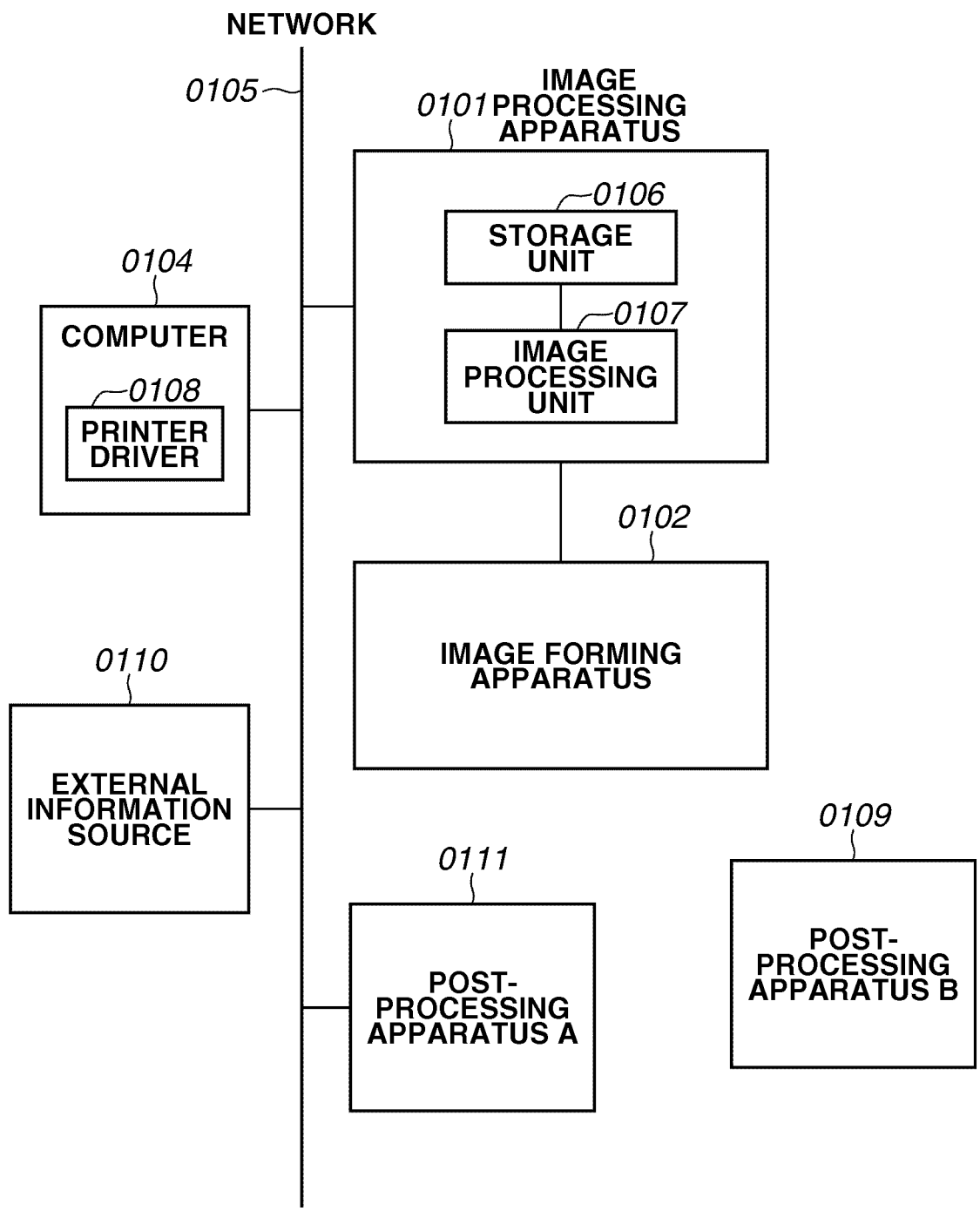
FIG. 10 illustrates an overall configuration of the printing system according to a second exemplary embodiment.

FIG. 10 illustrates an overall configuration of a printing system according to the present exemplary embodiment. The printing system according to the present exemplary embodiment includes an image processing apparatus 0101, an image forming apparatus 0102, a computer 0104, a network 0105, a post-processing apparatus A 0111, a post-processing apparatus B 0109, and an external information source 0110.

When a print job specifies a post-processing apparatus, the image processing apparatus 0101 acquires information about the post-processing apparatus from the storage unit 0106, the external information source 0110, or the print job. Then, according to a marking image generation instruction included in the print job, the image processing apparatus 0101 generates a predetermined marking image at a target position on a print product subjected to the post-processing by the post-processing apparatus, and combines the marking image with print image data.

The post-processing apparatus applies the predetermined finishing processing to the print product output by the image forming apparatus 0102. The post-processing apparatus will be described as a finisher in the present exemplary embodiment. The finisher refers to, for example, a puncher that makes holes on a print product, a stapler that applies staples to the print product, or a trimmer that cuts the print product. Although the post-processing apparatus is not directly connected to the image processing apparatus 0101, the post-processing apparatus has an aspect of a near-line finisher like the post-processing apparatus A 0111 which is connected to the network 0105. Further, the post-processing apparatus has an aspect of an off-line finisher like the post-processing apparatus B 0109 which is connected to neither the image processing apparatus 0101 nor the network 0105.

The external information source 0110 provides the image processing apparatus 0101 with information about the post-processing apparatus A 0111 and the post-processing apparatus B 0109. The external information source 0110 will be described as a server computer in the present exemplary embodiment. The server computer includes a storage unit which stores information about types, performance, accuracy, etc. of various post-processing apparatuses. In response to a request for the information from the image processing apparatus 0101, the server computer returns necessary information to the image processing apparatus 0101.

Figure 11:
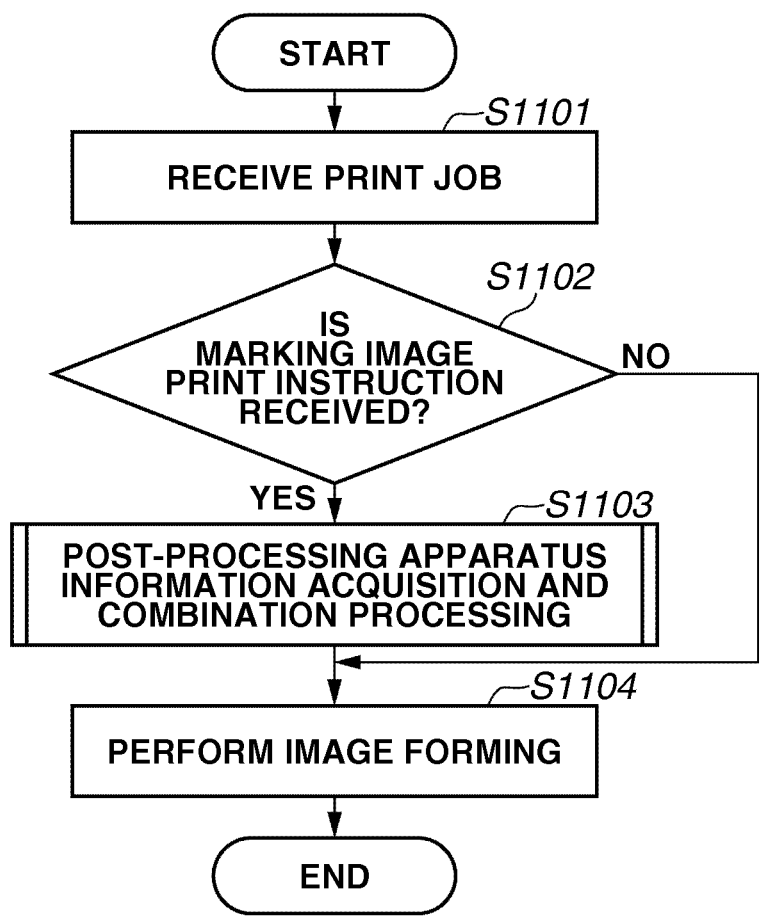
FIG. 11 is a flow chart illustrating operations executed in the printing system.

FIG. 11 is a flow chart illustrating operations executed in the printing system according to the present exemplary embodiment. In this flow chart, the processing by the image processing unit 0107 is achieved when the CPU 12 executes the image processing unit 0107 serving as a control program.

In step S1101, the image processing unit 0107 receives a print job transmitted from the printer driver 0108. In step S1102, the image processing unit 0107 determines whether the received print job includes a marking image print instruction corresponding to the post-processing to be applied by the print job. When the image processing unit 0107 determines that the print job includes the marking image print instruction (YES in step S1102), the processing proceeds to step S1103. Otherwise, when the image processing unit 0107 determines that the print job does not include the marking image print instruction (NO in step S1102), the processing proceeds to step S1104.

In step S1103, the image processing unit 0107 performs the post-processing information acquisition and combination processing. The post-processing information acquisition and the combination processing will be described in detail below with reference to FIG. 12. In step S1104, the image processing unit 0107 transmits the generated print image data to the image forming apparatus 0102. Then, the image forming apparatus 0102 prints the print image data on a recording sheet to produce a print product.

When post-processing is required to the print product printed by the image forming apparatus 0102, the print product is manually brought to the post-processing apparatus A 0111 or the post-processing apparatus B 0109, subjected to the post-processing by any one post-processing apparatus, and then output as a print outcome.

Figure 12:
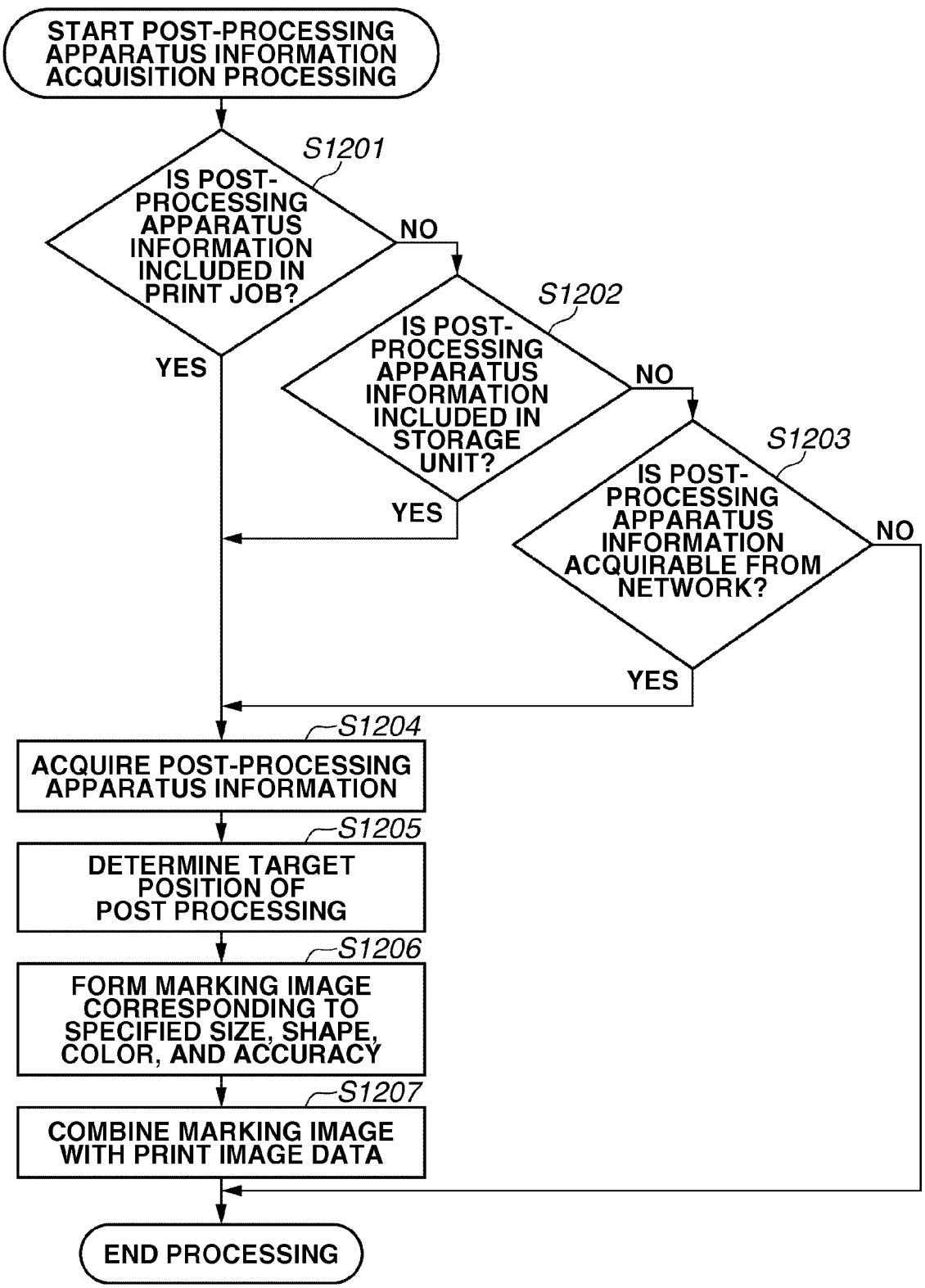
FIG. 12 is a flow chart illustrating operations executed in the printing system.

FIG. 12 is a flow chart illustrating detailed operation of the post-processing information acquisition and the combination processing (step S1103 in FIG. 11) included in the flow chart in FIG. 11. In this flow chart, the processing by the image processing unit 0107 is achieved when the CPU 12 executes the image processing unit 0107 serving as a control program.

In step S1201, the image processing unit 0107 determines whether the print job received in step S1101 in FIG. 11 includes post-processing information. When the image processing unit 0107 determines that the print job includes the post-processing information (YES in step S1201), the processing proceeds to step S1204. Otherwise, when the image processing unit 0107 determines that the print job does not include the post-processing information (NO in step S1201), the processing proceeds to step S1202.

In step S1202, the image processing unit 0107 determines whether the storage unit 0106 stores the post-processing information regarding the post-processing apparatus specified by the print job. When the image processing unit 0107 determines that the storage unit 0106 stores the post-processing information (YES in step S1202), the processing proceeds to step S1204. Otherwise, when the image processing unit 0107 determines that the storage unit 0106 does not store the post-processing information (NO in step S1202), the processing proceeds to step S1203.

In step S1203, the image processing unit 0107 determines whether the post-processing information regarding the post-processing apparatus specified by the print job can be acquired from the external information source 0110 via the network 0105. When the image processing unit 0107 determines that the post-processing information can be acquired (YES in step S1203), the processing proceeds to step S1204. Otherwise, when the image processing unit 0107 determines that the post-processing information cannot be acquired (NO in step S1203), the processing in this flow chart ends.

In step S1204, the image processing unit 0107 acquires the post-processing information. The post-processing information is acquired from an acquisition destination which is determined that the post-processing information can be acquired therefrom in steps S1201 to S1203, namely, the print job, the storage unit 0106, or the external information source 0110.

In step S1205, based on the contents of the instruction (selected puncher type) of the print job and the post-processing information acquired in step S1204, the image processing unit 0107 determines a target position subjected to the post-processing. The method for determining the target position subjected to the post-processing is as illustrated in FIG. 6. In step S1206, the image processing unit 0107 generates a marking image according to the size, shape, color, and accuracy of a marking image specified in the information about marking image generation included in the print job. The size of the marking image to be specifically generated is as illustrated in FIG. 7.

In step S1207, the image processing unit 0107 combines the marking image generated in step S1206 with the print image data generated by processing the print job, thus generates new print image data. After the new print image data is generated, the processing proceeds to step S1104 in FIG. 11.

When the image processing apparatus 0101 performs the above described processing, even in a case where the post-processing apparatus is a near-line finisher or an off-line finisher, the information about the post-processing apparatus specified by the print job is acquired, and similar effects to those of the first exemplary embodiment can be acquired in the second exemplary embodiment.

Although the present invention has specifically been based on the above described exemplary embodiments, the present invention is not limited thereto. The present invention can also be realized by executing the following processing. More specifically, software (a program) for realizing the functions of the above exemplary embodiments is supplied to a system or an apparatus via a network or various storage media and a computer (or CPU or micro processing unit (MPU)) of the system or the apparatus reads and executes the program. In this case, the program and the storage media storing the program constitutes the present invention. In this case, a computer executable program and the storage media storing the program are included in the present invention. In an example, a computer-readable medium may store a program that causes an image processing apparatus to perform a method described herein. In another example, a central processing unit may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-095271 filed Apr. 16, 2010, which is hereby incorporated by reference herein in its entirety.

What is claimed is:

1. An image processing apparatus comprising:
    a setting unit configured to allow a user to set marking image print instructions for a marking image;
    an acquisition unit configured to acquire post-processing information, wherein the post-processing information indicates a capability of a post-processing unit;
    a receiving unit configured to receive a print job, wherein the print job is configured to include marking image print instructions from the user and post-processing apparatus instructions that instruct to apply post-processing to a recording sheet;
    a determination unit configured to determine a marking image position based on a post-processing position, wherein the post-processing position is a recording sheet target position for post-processing that is to be applied by the post-processing unit based on the post-processing information; and
    a controller configured to cause a printing unit to print the marking image at the marking image position on the recording sheet and then to cause a post-processing unit to apply the post-processing at the post-processing position on the recording sheet,
    wherein, in response to determining that a marking image print instruction has been received, the controller cause the printing unit to print the marking image at the marking image position on the recording sheet and, in response to determining that post-processing apparatus instructions have been received, the controller cause the post-processing unit to apply the post-processing at the post-processing position on the recording sheet to allow a user to determine a pass or fail of post-processing applied to a recording sheet by determining whether a visibility of the marking image to the user meets predetermined criteria, and
    wherein, in response to determining that a marking image print instruction has been received, the controller cause the printing unit to change, according to information about an accuracy expected for the post-processing to be applied by the post-processing unit as set by the setting unit for a print instruction of the marking image included in the print job, a shape of the marking image to a shape that represents the accuracy set for the post-processing by the setting unit.

2. The image processing apparatus according to claim 1, wherein the controller causes the printing unit to change a shape of the marking image, to a shape suitable for the accuracy set for the post-processing, by increasing a size of the marking image according to an increase in the accuracy set for the post-processing by the setting unit and decreasing the size of the marking image according to a decrease in the accuracy set for the post-processing.

3. The image processing apparatus according to claim 1, wherein the controller causes the printing unit to print a marking image having a size smaller than a size of the post-processing to be applied by the post-processing apparatus.

4. The image processing apparatus according to claim 1, wherein, in response to determining that the post-processing information is included in the print job, the acquisition unit acquires the post-processing information from the print job.

5. The image processing apparatus according to claim 4, wherein, in response to determining that the post-processing information is not included in the print job, the acquisition unit determines whether the post-processing information is included in a storage unit and, in response to determining that the post-processing information is included in the storage unit, the acquisition unit acquires the post-processing information from the storage unit.

6. The image processing apparatus according to claim 5, wherein, in response to determining that the post-processing information is not included in the storage unit, the acquisition unit acquires the post-processing information from an external apparatus connected to the image processing apparatus via a network.

7. The image processing apparatus according to claim 1, wherein, when the print job includes a plurality of pages, the controller causes the printing unit to print the marking image only on a first page of the plurality of pages.

8. The image processing apparatus according to claim 1, wherein, when the print job includes a plurality of pages, controller causes the printing unit to print the marking image only on a first page and a last page of the plurality of pages.

9. The image processing apparatus according to claim 1, wherein the post-processing applied by the post-processing apparatus includes punching processing by a puncher, stapling processing by a stapler, or trimming processing by a trimmer.

10. The image processing apparatus according to claim 1, wherein the marking image position is based on capability information of the printing unit.

11. A method for controlling an image processing apparatus, the method comprising:
    allowing a user to set marking image print instructions for a marking image;
    acquiring post-processing information, wherein the post-processing information indicates a capability of a post-processing unit;
    receiving a print job, wherein the print job is configured to include marking image print instructions from the user and post-processing apparatus instructions that instruct to apply post-processing to a recording sheet;
    determining a marking image position based on a post-processing position, wherein the post-processing position is a recording sheet target position for post-processing that is to be applied by the post-processing unit based on the post-processing information; and
    causing, in response to determining that a marking image print instruction has been received, a printing unit to print the marking image at the marking image position on the recording sheet and causing, in response to determining that post-processing apparatus instructions have been received, the post-processing unit to apply the post-processing at the post-processing position on the recording sheet to allow a user to determine a pass or fail of post-processing applied to a recording sheet by determining whether a visibility of the marking image to the user meets predetermined criteria, and
    wherein, in response to determining that a marking image print instruction has been received, causing includes causing the printing unit to change, according to information about an accuracy expected for the post-processing to be applied by the post-processing unit as set for a print instruction of the marking image included in the print job, a shape of the marking image to a shape that represents the accuracy set for the post-processing.

12. The method according to claim 11, wherein causing includes causing the printing unit to change a shape of the marking image, to a shape suitable for the accuracy set for the post-processing, by increasing a size of the marking image according to an increase in the accuracy set for the post-processing and decreasing the size of the marking image according to a decrease in the accuracy set for the post-processing.

13. The method according to claim 11, wherein causing includes causing the printing unit to print a marking image having a size smaller than a size of the post-processing to be applied by the post-processing apparatus.

14. The method according to claim 11, wherein in response to determining that the post-processing information is included in the print job, acquiring includes acquiring the post-processing information from the print job.

15. The method according to claim 14, wherein, in response to determining that the post-processing information is not included in the print job, acquiring includes determining whether the post-processing information is included in a storage unit and, in response to determining that the post-processing information is included in the storage unit, acquiring includes acquiring the post-processing information from the storage unit.

16. The method according to claim 15, wherein, in response to determining that the post-processing information is not included in the storage unit, the acquiring includes acquiring the post-processing information from an external apparatus connected to the image processing apparatus via a network.

17. The method according to claim 11, wherein, when the print job includes a plurality of pages, causing includes causing the printing unit to print the marking image only on a first page of the plurality of pages.

18. The method according to claim 11, wherein, when the print job includes a plurality of pages, causing includes causing the printing unit to print the marking image only on a first page and a last page of the plurality of pages.

19. The method according to claim 11, wherein the post-processing applied by the post-processing apparatus includes punching processing by a puncher, stapling processing by a stapler, or trimming processing by a trimmer.

20. A non-transitory computer-readable storage medium storing a program to cause an image processing apparatus to perform the method according to claim 11.

* * * * *